US008498921B2

(12) United States Patent
Nordstrom et al.

(10) Patent No.: US 8,498,921 B2
(45) Date of Patent: Jul. 30, 2013

(54) SYSTEM AND METHOD FOR CHARGING TRADING COMMISSIONS FOR BROKERAGE ACCOUNTS BASED ON PRINCIPAL OF TRADES

(75) Inventors: Karyn Nordstrom, Pelham, NY (US); Angel Fung, Secaucus, NJ (US); James Jesse, New York, NY (US); Peter Barsoom, New York, NY (US); Uday Shankar, Green Brook, NJ (US); John Ly, Old Bridge, NJ (US)

(73) Assignee: Morgan Stanley Smith Barney Holdings LLC, Purchase, NY (US)

( * ) Notice: Subject to any disclaimer, the term of this patent is extended or adjusted under 35 U.S.C. 154(b) by 980 days.

(21) Appl. No.: 12/165,451

(22) Filed: Jun. 30, 2008

(65) Prior Publication Data
US 2009/0327109 A1 Dec. 31, 2009

(51) Int. Cl.
*G06Q 40/00* (2012.01)
(52) U.S. Cl.
USPC ............................................. 705/37; 705/35
(58) Field of Classification Search
USPC .......................................................... 705/35
See application file for complete search history.

(56) References Cited

U.S. PATENT DOCUMENTS

| 6,014,642 | A  | * | 1/2000  | El-Kadi et al. | 705/36 R |
|-----------|----|---|---------|----------------|----------|
| 7,707,097 | B1 | * | 4/2010  | Weiss et al.   | 705/37   |
| 2004/0254879 | A1 | * | 12/2004 | Dickerson | 705/38 |
| 2005/0246272 | A1 | * | 11/2005 | Kitada et al. | 705/40 |
| 2007/0027728 | A1 | * | 2/2007  | Schuver et al. | 705/4 |

OTHER PUBLICATIONS

Hershey, "Investing; The Rise of the Fee-Based Account," New York Times, Jan. 27, 2002.
*Financial Planning Assoc. v. Securities and Exchange Commission*, Case No. 04-1242 (D.C. Cir., Mar. 30, 2007).
Giannone, "Wall St. scrambles as court bans fee-based accounts," Reuters, May 17, 2007.

* cited by examiner

*Primary Examiner* — Hani M Kazimi
*Assistant Examiner* — Hatem M Ali
(74) *Attorney, Agent, or Firm* — K&L Gates LLP

(57) ABSTRACT

Systems and methods for determining a brokerage commission owed by a client of a brokerage firm based on the principal volume ("PV") of the client's eligible transactions over a time period. The system may comprise: (i) a database storing information about the client's transactions; and (ii) one or more processors in communication with the database. The processor(s) is programmed to determine the client's brokerage commission by: (i) calculating the cumulative PV of transactions made by the client through the brokerage firm over a time period; and (ii) calculating the commission for a billing time period based on the calculated cumulative PV. The applicable commission may be determined based on a tiered marginal commission rate schedule.

19 Claims, 20 Drawing Sheets

| PV Tiers | Marginal Rate (bps) |
|---|---|
| $0 to $199,999 | 225 |
| $200,000 to $299,999 | 215 |
| $300,000 to $399,999 | 205 |
| $400,000 to $499,999 | 185 |
| $500,000 to $599,999 | 175 |
| $600,000 to $699,999 | 165 |
| $700,000 to $799,999 | 155 |
| $800,000 to $899,999 | 145 |
| $900,000 to $999,999 | 135 |
| $1,000,000 to $1,999,999 | 100 |
| $2,000,000 to $3,999,999 | 85 |
| $4,000,000 and above | 60 |

Step 1: Identify Accounts for Pricing

Accounts Selected for Pricing Simulation

Accounts Selected: 2
Total YTD PV: $4,679,416.82
Total Assets: $9,879,416.82

Skip Pricing Simulation
Simulate Group Pricing — 364

| Account | YTD PV | Total Assets | Type | Action |
|---|---|---|---|---|
| xxx-xxxxxx-xxx Robert Gracen & Mary Gracen | $4,194,507.12 | $9,194,507.12 | AAA | Remove |
| xxx-xxxxxx-xxx GD&CO C/F Robert Gracen IRA Rollover Dated 08/22/06 | $484,909.70 | $684,909.70 | IRA | Remove |

Expand All / Collapse All

Indicates Statement Link Primary Account

| Group/Account | Name/Address | | | |
|---|---|---|---|---|
| xxx-xxxxxx-xxx | Robert Gracen & Mary Gracen | | | |
| xxx-xxxxxx-xxx | Robert Gracen & Mary Gracen 17 Mulberry Rd Pound Ridge, NY 10576-2132 | | | |
| xxx-xxxxxx-xxx | GD&CO C/F Robert Gracen IRA Rollover Dated 08/22/06 17 Mulberry Rd Pound Ridge, NY 10576-2132 | $302,224.14 | $402,224.14 | IRA |
| xxx-xxxxxx-xxx | GD&CO C/F Mary Gracen IRA Rollover Dated 08/31/06 17 Mulberry Rd Pound Ridge, NY 10576-2132 | | | |
| xxx-xxxxxx-xxx | Robert Gracen & Mary Gracen Advisory Portfolio 17 Mulberry Rd Pound Ridge, NY 10576-2132 | $32,232.28 | $52,232.28 | Advisory |

Step 2: Evaluate Pricing

Account History for Grouped Accounts

Accounts Selected for Pricing Simulation
Accounts Selected: 2
Total YTD PV: $4,679,416.82
Total Assets: $9,879,416.82

Trading (PV)

| | Year to Date | 2006 |
|---|---|---|
| Equities | $3,007,650 | $4,348,085 |
| Options | $1,671,767 | $2,393,137 |
| Totals | $4,679,417 | $6,741,222 |

Client Fee

| | Year to Date | 2006 |
|---|---|---|
| Equities | $21,309 | $28,102 |
| Options | $10,876 | $12,034 |
| Other | $0 | $0 |
| Totals | $32,095 | $40,136 |

*This Pricing Simulation below is designed to illustrate the impact of applying the new pricing structure.*

| Simulator | Account Detail |
|---|---|

Pricing Scenario: Simulate client billings based on Year to Date (01-01-2007 to 10-09-2007) PV ($6,679,416)

| Account | PV Historical (Year to Date) | PV Simulated* (Annual) | Client Fee Historical (Year to Date) | Client Fee Simulated* (Annual) | Effective Rate (bps) Historical (Year to Date) | Effective Rate (bps) Simulated* (Annual) | Effective Discount | Gross Compensation Simulated* (Annual) |
|---|---|---|---|---|---|---|---|---|
| xxx-xxxxxx-xxx | $4,194,507.12 | $5,987,254.19 | $28,769.12 | $35,680.16 | 59.5 | 59.5 | 35.0% | $33,598.78 |
| xxx-xxxxxx-xxx | $484,909.70 | $692,161.81 | $3,325.88 | $4,124.84 | 59.5 | 59.5 | 35.0% | $3,884.22 |
| Totals | $4,679,416.82 | $6,679,416.00 | $32,095.00 | $39,805.00 | | | | $37,483.00 |

*For simulation purposes, partial year historical data has been annualized.

<< Prior Step | Customize Pricing ← 380 | Apply Pricing

Pricing Consent

Accounts to be Grouped and Enrolled

Group Name: Robert Gracen & Mary Gracen

The name of the authorized signatory and the date they provided oral consent to apply the pricing must be entered for each account.

| Account | Name | PV Reset Date | YTD PV | Total Assets | Type | Authorized Signatory Name(s) | Consent Date |
|---|---|---|---|---|---|---|---|
| xxx-xxxxxx-xxx | Robert Gracen & Mary Gracen | 03-01-2008 | $4,194,507.12 | $9,194,507.02 | AAA | | |
| xxx-xxxxxx-xxx | GD&CO C/F Robert Gracen IRA Rollover Dated 08/22/06 | 03-01-2008 | $484,909.70 | $684,909.70 | IRA | | |
| | | Totals: | $4,679,417.82 | $9,879,416.72 | | | |

Baseline Discount = 32.0 %

The Baseline Discount is the minimum discount that will be applied to the principal volume in the above accounts every quarter. The baseline discount cannot be reduced without getting consent from your client(s).

Financial Advisor Certification

For each account identified above, I disclosed the following to my client(s):

☐ The pricing program is appropriate for moderate to active traders. Depending upon the frequency and volume of my client's trading activity, paying commissions on a per-trade basis may cost more or less than quarterly commissions.

☐ How the pricing works and how it differs from traditional commissions-based pricing including some of the following:
  - The pricing only applies to eligible equities and options trading;
  - Billing is quarterly in arrears;
  - The same effective rate will apply to all trades executed in the same quarter;
  - The Commission Schedule resets the Anniversary Date and PV goes back to zero;
  - How the pricing works and whether my currently has any brokerage accounts eligible for grouping;
  - A minimum quarterly commission may apply; and
  - An annual brokerage account fee may apply.

☐ My client's trading on the pricing program will get the Baseline Discount noted above.

[Cancel]   [<< Prior Step]  [Submit]

Fig. 19

Pricing Confirmation

The following Accounts were grouped and enrolled into the pricing program or saved for later processing

Group Name: Robert Gracen & Mary Gracen

| Account | Name | PV Reset Date | YTD PV | Total Assets | Type | Authorized Signatory Name(s) | Consent Date |
|---|---|---|---|---|---|---|---|
| xxx-xxxxxx-xxx | Robert Gracen & Mary Gracen | 03-01-2008 | $4,194,507.12 | $9,194,507.02 | AAA | Robert Gracen | 10-10-2007 |
| xxx-xxxxxx-xxx | GD&CO C/F Robert Gracen IRA Rollover Dated 08/22/06 | 03-01-2008 | $484,909.70 | $684,909.70 | IRA | Account Pending Pricing - Requires Verbal Consent | |
| | | Totals: | $4,679,417.82 | $9,879,416.72 | | | |

Baseline Discount

This is the minimum discount that was applied. It is important to recognize that you will not be permitted to go below this baseline discount for all quarters.

32.0%

SYSTEM AND METHOD FOR CHARGING TRADING COMMISSIONS FOR BROKERAGE ACCOUNTS BASED ON PRINCIPAL OF TRADES

BACKGROUND

A brokerage account is an investment account that an investor has with a brokerage firm through which the investor can buy and sell securities, such as stocks and options, and other products. Currently, an investor/client with a brokerage account is typically charged commissions for equities, options and certain other transactions on a trade-by-trade basis.

Another option for an investor is to use an investment advisory account. In such an account, the client typically pays a quarterly fee in advance based upon the client's assets under management, which is irrespective of the number of transactions.

SUMMARY

In one general aspect, the present invention is directed to systems and methods for determining a periodic commission based on the cumulative principal volume ("PV") of a client's eligible trades executed in a brokerage account. Eligible trades include transactions for which commissions would otherwise be charged on a trade-by-trade basis. For example, eligible trades could include the purchase or sale of listed and unlisted stocks, certain preferred stocks, over-the-counter stocks, exchange-traded funds, certain options and certain structured products. Such a pricing approach may be more appropriately suited for moderate to active investors who prefer a brokerage account. The PV of the client's trades may be dependent on the security types involved in the client's trades. For example, for a trade involving an equity security (e.g., a stock), the PV of the trade may be determined based on the number of shares times the share price of the equity security at the time of the transaction. For a trade involving an option, the PV may be based on the premium. For example, the PV may be computed based on the number of contracts, the number of shares per contract, and the premium per share. The pricing approach could be used for other types of investments as well. The computer-implemented process may involve calculating the cumulative PV of all trades made by the client through the broker over a time period, and then calculating the commission for a billing time period based on the calculated PV for the first period. The commission could be computed periodically, such as following billing time periods of regular intervals, such as calendar quarters.

In various embodiments, commissions may be calculated based on a published declining marginal commission rate schedule, which applies to eligible cumulative trading activity over a period of time (e.g., 1 year) and resets at the end of the time period. Clients may elect an annual cycle where they are billed quarterly in arrears based on the PV of their eligible trades during each quarter. According to various embodiments, the ending PV of one quarter becomes the starting PV of the next quarter; thus, the marginal commission rate declines the more a client trades over the course of the year. An effective blended commission rate may be applied to each trade executed during the quarter by dividing the quarterly commission by the PV of the trades executed in the quarter. The effective rate for the year as a whole is an average of the blended rates of the four quarters. Because marginal rates drop as PV increases, clients may pay higher commissions at the beginning of the year than at the end.

Such a pricing structure provides many advantages to the client and the brokerage firm over ordinary trade-by-trade commission structures because it is transparent and predictable. In traditional brokerage accounts, commissions are charged trade-by-trade, the commission rate fluctuates with the size of the individual trade and the rate schedule is generally not published. Using the cumulative PV approach, the more a client trades, the lower the marginal commission rate and, hence, the more predictable the client's commissions. Such an approach also offers more transparency to the client because the rate schedule is published and the client's periodic statements may reflect the effective commission rate for the billing period. This approach also may simplify the processes of calculating brokerage commissions because traditional commission schedules may include factors other than PV including, for example, number of shares traded. Further, by using a marginal rate schedule, a client may be more likely to group their brokerage accounts with this pricing structure to achieve even lower rates.

In another general aspect, the present invention is directed to computer-based systems and methods for simulating and modeling a client's brokerage commissions under the cumulative PV-based fee structure based on the client's past trading activity and/or projected trading activity. That way, the broker can assess whether the cumulative PV-based pricing program is appropriate for a particular client.

FIGURES

Various embodiments of the present invention are described herein by way of example in conjunction with the following figures, wherein:

FIG. 3 is a diagram of an example rate schedule;

FIGS. 13-20 are example screen shots according to embodiments of the present invention.

DETAILED DESCRIPTION

In general, the present invention is directed to computer-based systems and methods for calculating and charging a client of a brokerage firm periodic brokerage commissions based on the cumulative PV of the trades made by the client over a given time period, such as quarterly or annually. The trades may involve equities (e.g., stocks), options, or other securities that would otherwise be charged trade-by-trade commissions. In one embodiment, the brokerage commission is based on a percentage of the cumulative PV of the trades made by the client over the given time period (e.g., the billing period). The percentage, as described further below, may be based on a pricing schedule where the percentage is higher for low cumulative PVs and lower for high cumulative PVs. Clients may be billed in arrears on a periodic basis (e.g., quarterly) based on the client's cumulative PV over the billing cycle and the applicable effective rate. In this way, the commission is charged once at the end of each calendar quarter and is based on trading activity, not assets.

According to various embodiments, only brokerage accounts are eligible for such a pricing program. Eligible accounts may include, for example, individual, joint, custodian, guardian, trust, retirement (such as IRAs) and business accounts.

Figure 1:
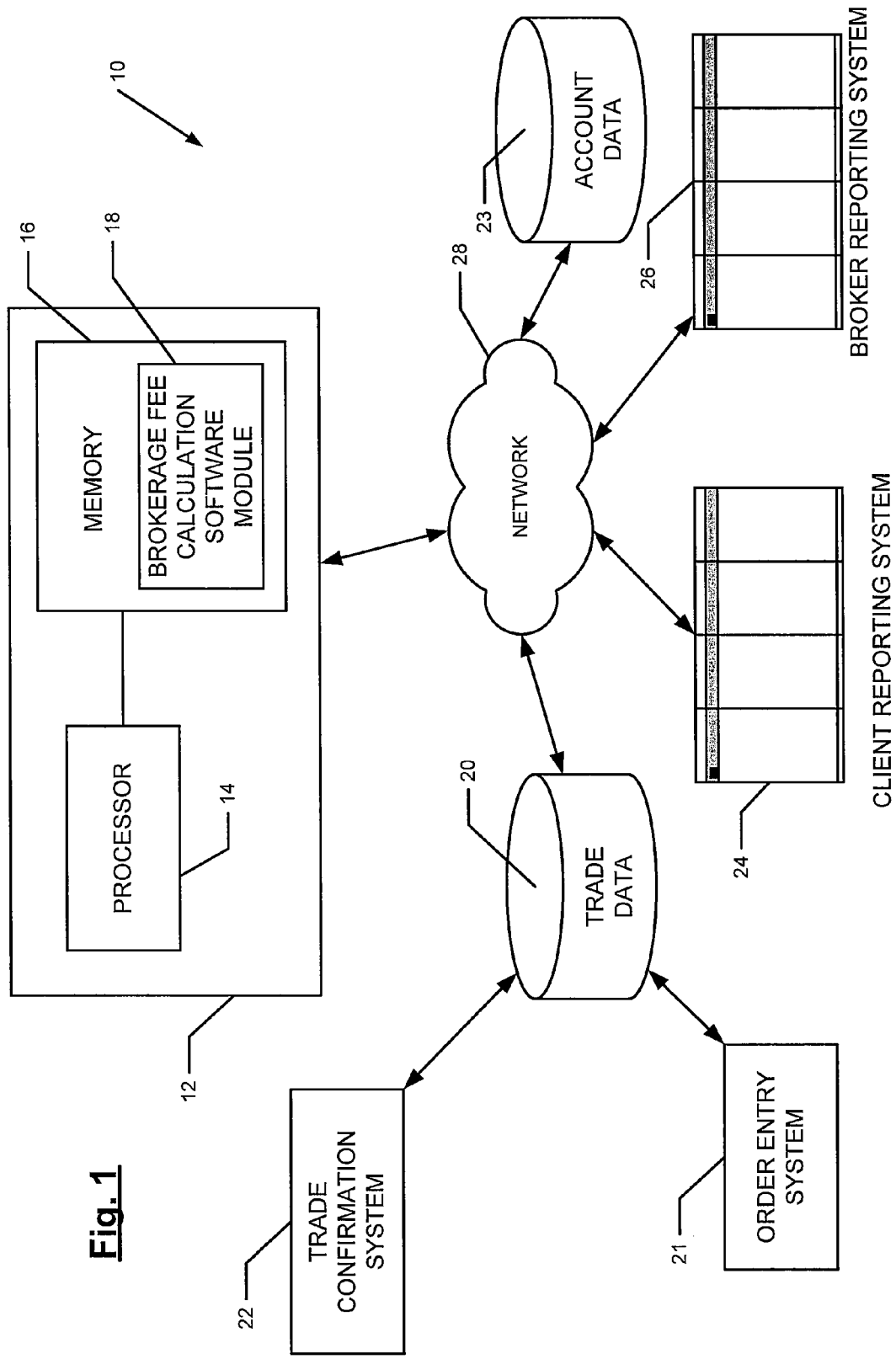
FIG. 1 is a simplified diagram of a system according to various embodiments of the present invention.

FIG. 1 is a simplified diagram of a computer system 10 according to one embodiment of the present invention. As shown in FIG. 1, the computer system 10 includes at least one computing device 12 for calculating the periodic commissions for a client's brokerage account based on the cumulative PV approach. The computing device 12 may be, for example, a personal computer, a laptop, a mainframe, a server, or any other suitable computing device. Although only one computing device 12 is shown in FIG. 1, it should be recognized that the system 10 may comprise a number of networked computing devices 12 operating cooperatively to calculate the periodic brokerage commissions for the numerous clients of a brokerage. The computing device 12 may comprise one or more processors 14 and one or more memory units 16, although for convenience only one processor and one memory unit are shown in FIG. 1. The processor 14 may have one or multiple cores. The memory 16 may be any suitable type of computer-readable medium, such as, for example, random access memory (RAM), read-only memory (ROM), a magnetic medium, such as a hard drive or floppy disk, or an optical medium, such as a CD-ROM.

As shown in FIG. 1, the memory 16 may comprise a brokerage commission calculation software module 18. The periodic brokerage commission calculation software module 18 may be implemented as software code to be executed by the processor(s) 14 using any suitable computer language. The software code may be stored as a series of instructions or commands in the memory unit 16. When the processor 14 executes the code of the brokerage commission calculation software module 18, the processor 14 may be caused to calculate the brokerage commission for a client based on the PV of trades made by the client over a given time period. According to various embodiments, the brokerage commission could be calculated periodically, that is, from time to time or at regular intervals, such as quarterly.

When a client makes a trade through his/her broker, particulars regarding the trade may be entered into a trade database 20 by a computer-based order entry system 21. The trade particulars may include, for example: the security traded (i.e. symbol, CUSIP, SEDOL); the nature (or side) of the transaction (e.g., buy or sell); the counterparty; the quantity; the price; and the time stamp. The database 20 may be, for example, a relational database system that stores the trade data for each client of the brokerage. A computer-based trade confirmation system 22 may then generate a trade confirmation for the client. For a client who has an account where commissions are calculated using a blended effective rate for the billing period based on the cumulative PV of the client's trades as described herein, the trade confirmation cannot show the commission for a particular trade because the blended rate cannot be calculated until the close of the billing period.

The processor(s) 14 of the computing device 12, when executing the code of the periodic brokerage commission calculation software module 18, is caused to calculate the commissions for clients of a broker based on the PV of the clients' trades. Periodic commissions may be calculated based on, in part, the trade data stored in the trade database 20 and account information for the clients stored in the account database 23.

Figure 2:
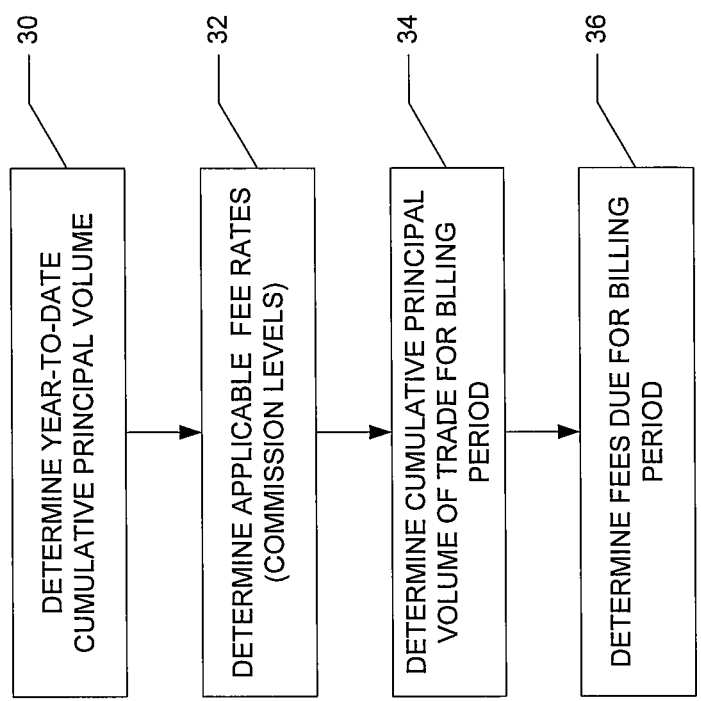
FIG. 2 is diagram of a process flow of the system of FIG. 1 according to various embodiments of the present invention.

FIG. 2 is a diagram of the process flow of the processor 14 when executing the code of the periodic brokerage commission calculation software module 18 according to various embodiments of the present invention. Periodic commissions may be based on a percentage of the cumulative PV of a client's trades over the billing period, taking into consideration the client's cumulative PV over a larger time period. According to various embodiments, the time period could be the client's anniversary year-to-date ("YTD"), the prior twelve months, the calendar YTD, the fiscal YTD, or any other suitable time period. For purposes of simplicity, the following description and FIG. 2 assumes that the client's cumulative PV is determined based on the client's anniversary YTD, although the invention is not so limited. First, the computing device 12 may determine the appropriate percentage or commission rate to be used when calculating the client's commissions. The system 10 may do this by first, at step 30, calculating the cumulative PV of the client's YTD trades based on the trade data stored in the database 20.

To calculate the cumulative PV, the PV for each trade by the client over the relevant time period must be determined and summed. The PV for a trade may be calculated based on the type of security involved in the trade. For equity trades, such as stock, the PV of a trade may be computed as the stock price times the quantity. For example, if the client bought (or sold) N shares of ABC Co. stock at a price of $x, the PV of the trade would be $ N·x. For an options transaction, the PV may be based on the total premium for the transaction. In various embodiments, the total premium may be calculated based on a premium per share. In such embodiments, the PV may equal the number of option contracts involved in the transaction times the number of units (e.g., shares) per contract times the premium per share. For example, if each option contract was for one hundred shares, and if the client bought 100 option contracts (each contract for 100 shares), and if the premium for the transaction was $1 per share, the PV for this options transaction would be $10,000. As another example, if the premium is $2 per share and the client sells 50 option contracts (with 100 shares per option contract), the PV for this trade would be $10,000.

Next, at step 32, the computing device 12 may determine the appropriate commission levels (e.g., marginal rates) to be applied to the client's trades. According to one embodiment, the system 10 may use a look-up table to determine appropriate commission levels (subject to discounts, if any). The look-up table may be stored in one of the memory units 16 of the computing device 12 or some other storage unit accessible by the computing device 12. According to one embodiment, the look-up table may include data indication a declining marginal rate, (i.e., the higher the cumulative PV of the trades, the lower the marginal rate percentage, and vice versa). FIG. 3 illustrates an example commission schedule according to one embodiment of the present invention. As the example in FIG. 3 illustrates, the commission percentage might be: 225 basis points (bps) of the PV if the client's cumulative YTD PV was $0 to $199,999; 215 bps if the client's YTD PV was $200,000 to $299,999; 205 bps if the client's YTD PV was $300,000 to $399,999; and so on. As described further below, the client may pay different commission rates for each tranche of the schedule, depending on the client's cumulative PV.

The rate schedule of FIG. 3 is an example of a declining marginal rate. Such a rate schedule might incentivize an investor to consolidate or group all of his/her brokerage accounts with this pricing approach to accelerate the time it takes to reach the higher cumulative transaction levels that correspond to lower brokerage commission rates. Of course, different rate schedules could be used, including one with fewer or more tiers, ones with different tier levels and/or different rates, etc.

Referring back to FIG. 2, after the appropriate commission levels are determined, the actual commissions due for the billing period (e.g., quarter or year) may be determined. To do this, the computing device 12, at step 34, may compute the cumulative PV of the client's trade for the billing period based on the trade data stored in the database 20. For example, if the billing period is a calendar quarter, the computing device 12 may compute the cumulative PV of the client's trades over the quarter. Then, at step 36, the commissions due may be calculated by applying the commission levels determined at step 32 to the cumulative PV for the billing period determined at step 34. For example, if a client's cumulative YTD PV is $300,000 such that the commission level determined at step 32 is 205 bps, and the cumulative PV of the client's trades over the billing period is $50 k, the commission in this example would be $1,025 (computed as 0.0205 times $50,000).

As another example, using the rate schedule of FIG. 3, suppose that in the first billing cycle of a year, the cumulative PV of the client's trades is greater than the upper cutoff for the first billing tier (that is, greater than $199,999 in the example of FIG. 3). In that case, the client's periodic commission may be calculated by applying the highest rate (225 bps) for the first $199,999 in PV, the second highest rate (215 bps) for the next $100 k in PV, and so on. For example, suppose that in the first billing cycle, the cumulative PV of the client's trades is $550 k. In that case, using the example rate schedule of FIG. 3, the commission for the billing cycle would be $11,425, calculated as shown in the table below.

| Principal Volume Tiers | Marginal Rate (bps) | Client's PV | Commission |
| --- | --- | --- | --- |
| $0 to $199,999 | 225 | $199,999 | $ 4,499.98 |
| $200,000k to $299,999 | 215 | $100,000 | $ 2,150.00 |
| $300,000 to $399,999 | 205 | $100,000 | $ 2,050.00 |
| $400,000 to $499,999 | 185 | $100,000 | $ 1,850.00 |
| $500,000 to $599,999 | 175 | $ 50,001 | $ 875.02 |
| | Total = | $550,000 | $11,425.00 |

Suppose further that in the next billing period the cumulative PV of the client's trades was $200,000 making the year-to-date cumulative PV $750,000. In that case, again using the example rate schedule of FIG. 3, the client's commission for the billing cycle would be $3,300, calculated as shown in the table below.

| Principal Volume Tiers | Marginal Rate (bps) | Client's PV | Commission |
| --- | --- | --- | --- |
| $500,000 to $599,999 | 175 | $ 49,999 | $ 874.98 |
| $600,000 to $699,999 | 165 | $100,000 | $1,650.00 |
| $700,000 to $799,999 | 155 | $ 50,001 | $ 775.02 |
| | Total = | $200,000 | $3,300.00 |

The periodic brokerage commissions owed by a client as computed by the computing device 12 may be stored in the memory unit 16 or some other store, database, memory, or file associated with the computing system 10. In addition, the computed commissions may be transmitted to another computer system via a computer network, for example.

The system 10 described above was described in the context of computing the periodic brokerage commissions for one client. Of course, the system 10 could be scaled to compute such commissions for every client of a brokerage firm electing such a pricing feature or for every client of a particular office of the brokerage firm. According to various embodiments, the clients participating in such a pricing program may be billed quarterly in arrears. For example, the clients might be billed on the third business day in the month following each quarter end and brokerage commissions may be debited from the clients' account as of that day. The client's year-to-date PV may be determined by the anniversary date, and may be reset on the anniversary date.

According to various embodiments, the client's anniversary date may be the last day of the calendar quarter in which the client enrolls in the pricing program in various embodiments. For example, if a client is enabled for an account on Apr. 15, 2008, the first year anniversary for this account may be Jun. 30, 2009, because June 30 is the last day of the second calendar quarter. Thus, in this example, the computing device 12 might determine the cumulative YTD PV for the client's first year in the pricing program based on trades by the client from Apr. 15, 2008 to Jun. 30, 2009. The YTD figure could be reset each year on the client's anniversary date. That is, for example, in the second year of the client's account in the example above—that is, from Jul. 1, 2009 to Jun. 30, 2010— the computing device 12 would look at the cumulative PV of the trades from Jul. 1, 2009 to Jun. 30, 2010 in determining the appropriate commission rate. Although the discussion above assumes that the cumulative PV is based on a one-year time period ending at the client's anniversary date, it should be recognized that different time periods could be used to establish the applicable fee rate in other embodiments, such as six months, two years, etc. In addition, different ways for setting the anniversary data could be used. For example, the anniversary date could be set as the first day of the next calendar month following the client's enrollment in the program according to various embodiments.

Figure 9:
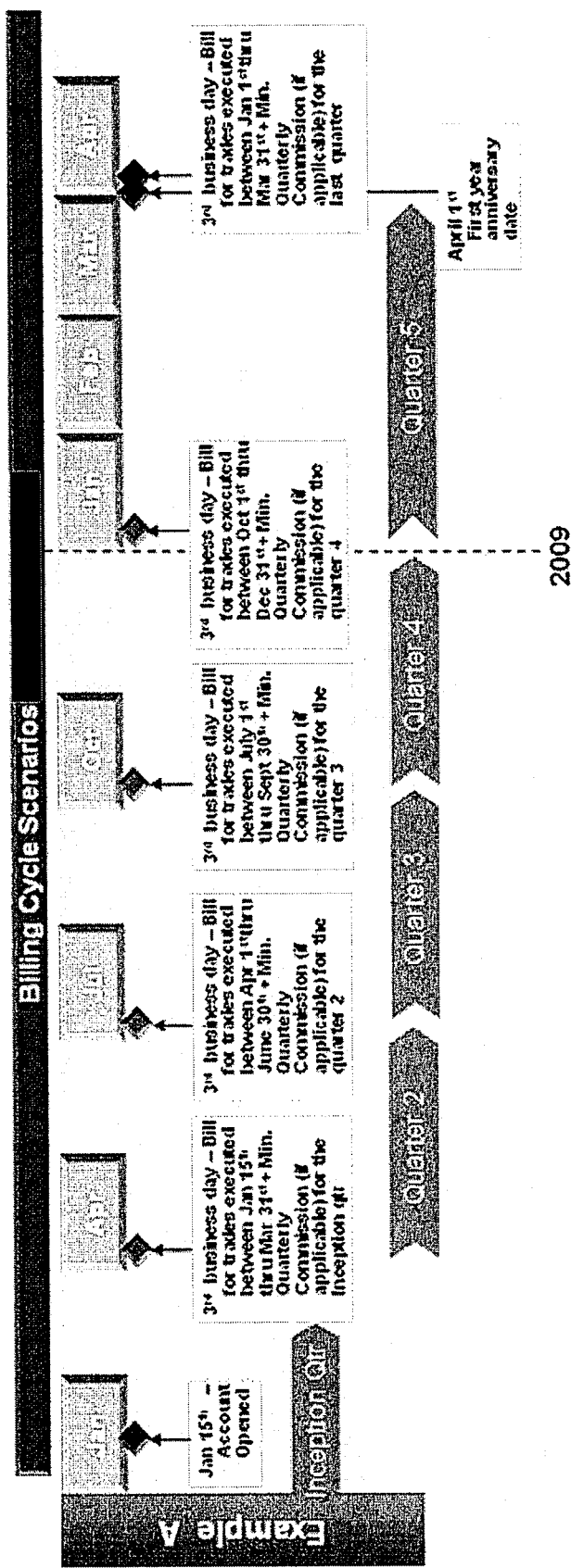
FIG. 9 illustrates an example of the billing cycle according to various embodiments of the present invention.

FIG. 9 shows an example of the billing cycle according to various embodiments of the present invention. In FIG. 9, the client enrolled in the program on Jan. 15, 2008, making the client's first anniversary date Mar. 31, 2009 because, in this embodiment, the anniversary date is the last day of the calendar quarter in which the client enrolls in the program. The first billing cycle for the account ends on Mar. 31, 2008, and the client is billed on the third business day in April 2008 for trades executed between Jan. 15, 2008 and Mar. 31, 2008. In various embodiments, the client's account is debited the fee amount on the billing date. The process is repeated every quarter in this example, the client being billed/debited on the $3^{rd}$ business day of July, October, January, and so on.

According to various embodiments, accounts with cumulative PV pricing may be grouped to meet any asset minimums to incept such pricing and to aggregate PV to achieve potentially lower effective commission rates for the group. In grouped accounts, the PV of the group may be the sum of the PVs of the individual accounts comprising the group and the total PV of the group may be used to determine the effective commission rate for the group. The same effective commission rate may apply to all trades executed by the group in a billing period and actual commissions for each individual account in the group may be calculated by applying that effective rate to the PV of trades executed within each account within the billing period. The anniversary date for the individual accounts within a group may remain the same and there need not be a group anniversary date. According to various embodiments, only accounts that have the same mailing address and broker can be grouped, subject to certain account ownership restrictions and exceptions. As with ungrouped accounts, if no eligible trades are placed, there is no commission charged.

Returning to FIG. 1, a computer-based client reporting system 24 and a computer-based broker reporting system 26 may be in communication with the computing device 12 via one or more networks 28. The systems 24, 26 may be implemented as one or a number of networked computing devices, such as servers, mainframes, etc. The network(s) 28 may be a LAN, WAN, MAN, or any other suitable computer network.

The client reporting system 24 may generate reports (whether paper and/or electronic) for clients detailing the clients' trading activity and account balances for their brokerage account over the billing period. Periodic brokerage commissions due by a client, as computed by the computing device 12, may be deducted from the client's account. The broker reporting system 26 may generate reports for a broker showing the trading activity and account balances for each of the broker's clients, including the brokerage commissions charged to the clients.

Although the computing device 12 and the reporting systems 24, 26 are shown in FIG. 1 as separate devices, the computing device 12 could be integrated with either reporting system 24, 26, for example, in which case the periodic brokerage commission calculation software module 18 may be stored on a memory unit of the reporting system 24, 26 and executed by a processor(s) of the reporting system 24, 26.

Embodiments of the present invention are also directed to a computer-based system where a user, e.g., a financial advisor ("FA") or a branch manager of a broker, can simulate pricing for a client under the cumulative PV-based pricing program to assess or determine whether the cumulative PV-based rate structure as described above is appropriate for the client. Simulations can be done for existing clients of the brokerage who have a different pricing program (such as a traditional commission based account) to evaluate whether the cumulative PV-based pricing approach is appropriate for the client. The simulations may be based on historical trade data. For an existing client of the brokerage, the historical trade data should be available, such as in the databases 20, 23. Simulations can also be conducted for prospective new clients of the brokerage firm. Prospective clients may be asked to provide or estimate historical trade activity for purposes of performing the simulation. This trade data may be stored in a database and used in the simulation. The simulations may be performed over a number of different time ranges, including: (i) year-to-date; (ii) prior year; or (iii) trailing twelve months.

Figure 4:
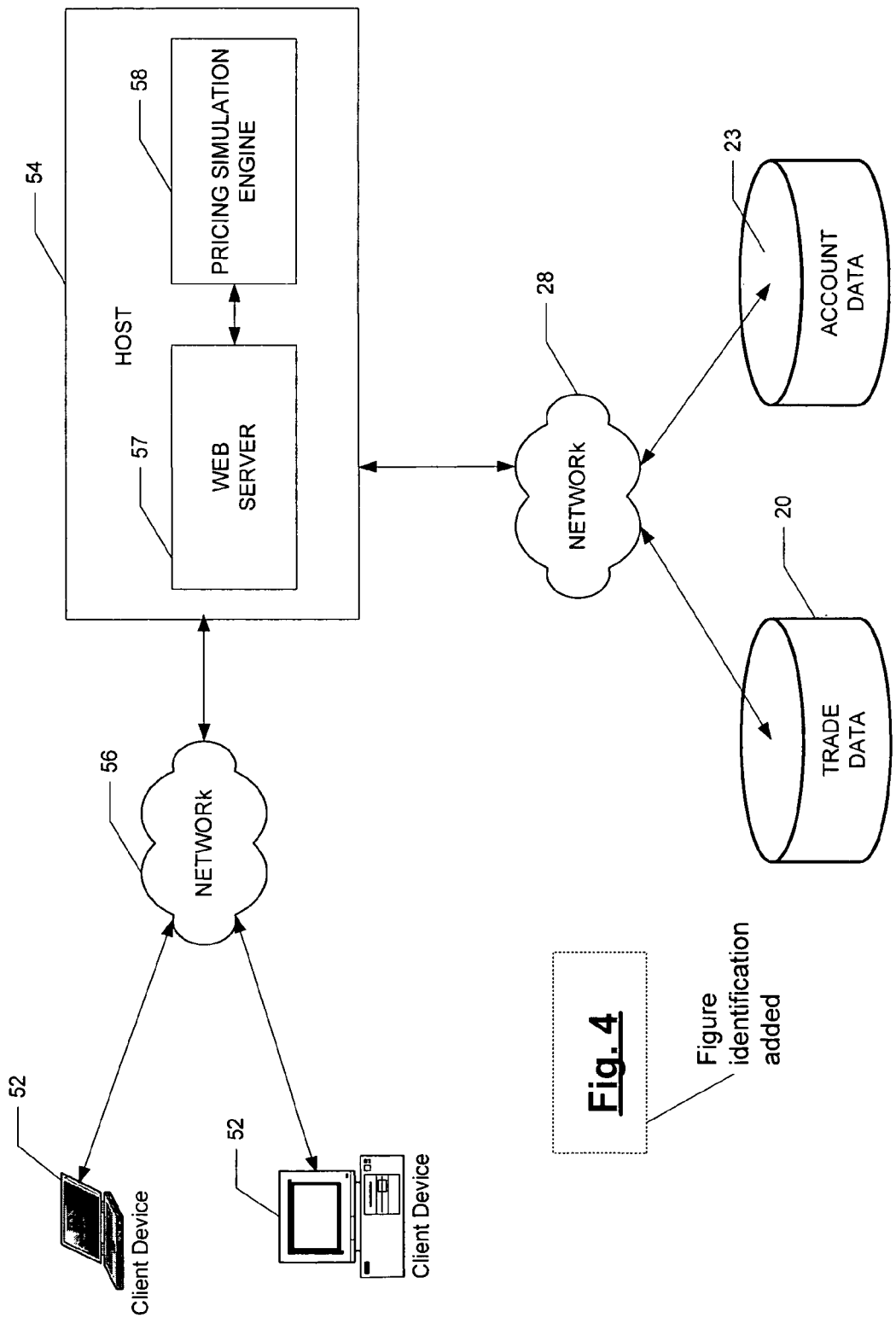
FIG. 4 is a diagram of a system for forecasting a client's brokerage commissions based on the projected trading activity according to various embodiments of the present invention.

FIG. 4 is a simplified diagram of such a pricing simulation system 50. As shown in FIG. 4, a number of users (e.g., FAs or branch managers associated with the brokerage firm offering the cumulative PV-based pricing structure) at client devices 52 (sometimes referred to as "users 52") may be in communication with a host system 54 via one or more networks 56. The network(s) 56 may be, for example, a LAN, WAN, MAN, or any other suitable computer network, including the Internet. The host system 54 may comprise one or a number of networked computer devices, such as servers and/or mainframes. As shown in FIG. 4, the host system 54 may comprise, among other things, a web server 57 and a pricing simulation engine 58.

The web server 57 may be a computer program, executed by a processor(s) of the host 54, that generates and serves web or HTML pages, or other types of files, to the end users 52 via the network 56 based on the pricing simulations computed by the pricing simulation engine 58. The pricing simulation engine 58 may comprise software, which when executed by a processor(s) of the host 54, computes forecasted brokerage commissions for clients using the cumulative PV-based commission structure described herein. The pricing simulation engine 58 may compute the forecasts using projections of future trading that are based on historical, client-specific trade data stored in the database 20. The analysis from the pricing simulation engine 58 may be served in web or HTML pages or other types of files to the end users 52. The users 52 may log onto the host system 54 to access the simulation results, and a web browser or any other suitable application installed on the client device 52 may be used to display the files (e.g., web pages) served by the host 54 to the user and to allow the user to interact with the files (such as inputting data). In such a manner, using a web-based interface, for example, the users 52 can assess whether the cumulative PV-based commission structure is appropriate for particular clients. In other embodiments, the pricing simulation engine 58 software may be stored at the user device 52 and/or executed by a processor of the client device 52.

Figure 5:
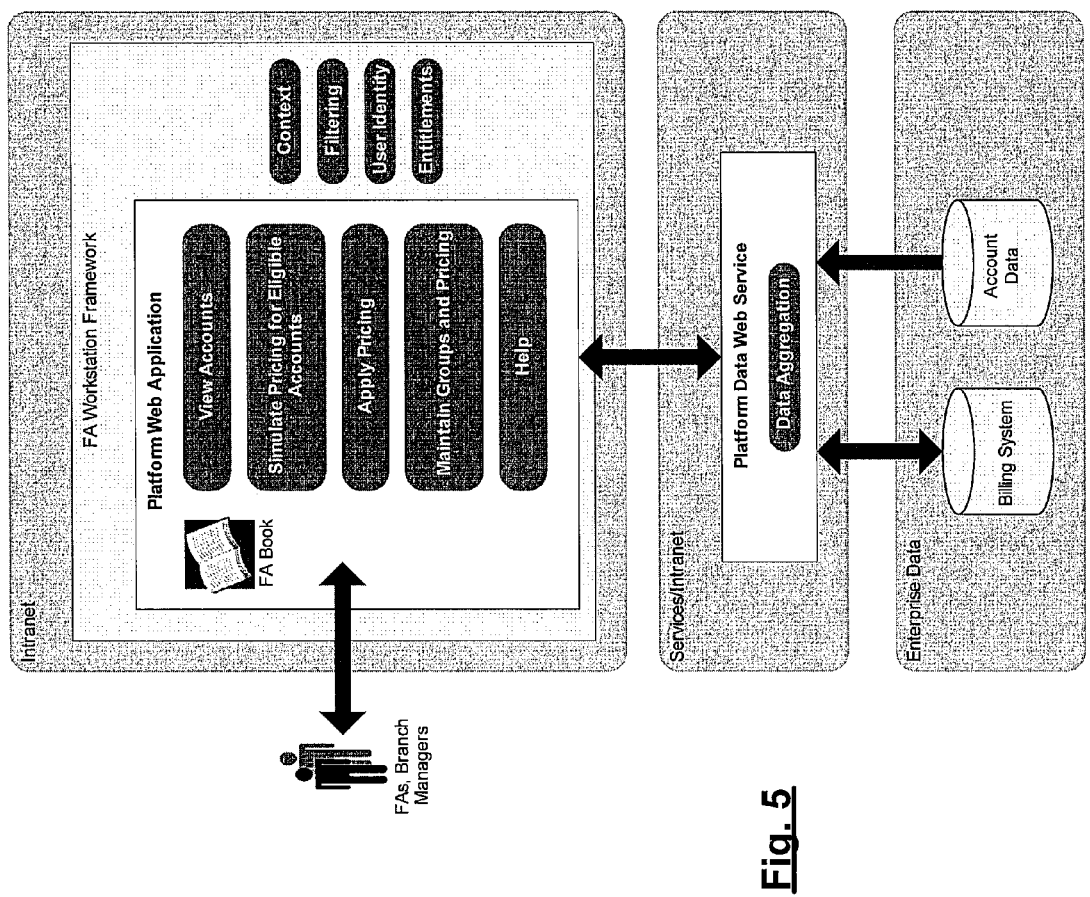
FIGS. 5 and 6 depict a web-based application according to various embodiments of the present invention.
Figure 6:
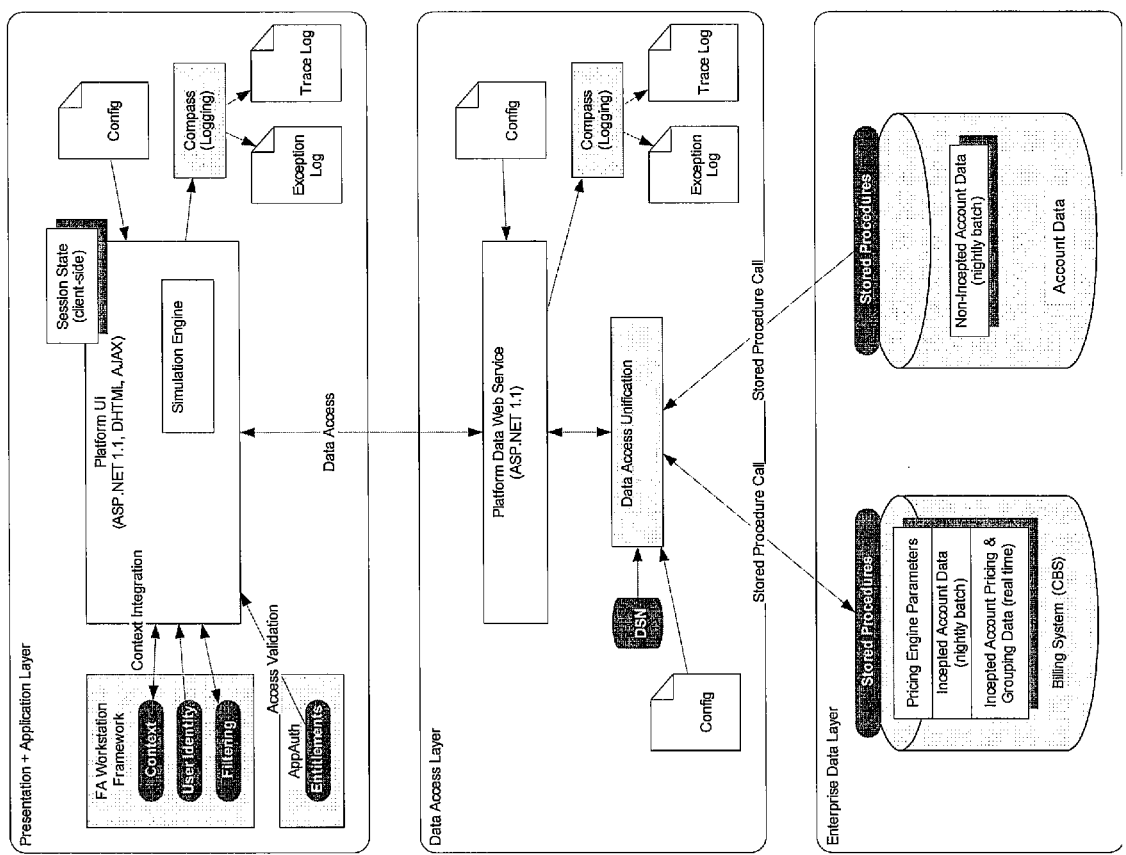

FIG. 5 illustrates a high-level design for the web-based application and FIG. 6 depicts the logical design of the application according to various embodiments of the present invention. The framework 300 at the user workstation 52 may provide the user with various functionalities, including viewing accounts 302, simulating pricing 304, applying the pricing for an account 306, maintaining groups and pricing 308, etc. The viewing accounts module 32 may allow the FA to view existing accounts, including those accounts that do not have the cumulative PV-based pricing program. As described further below, the FA could select from those accounts to simulate a client's commission under the cumulative PV-based approach, using the simulating pricing module 304, and to enroll the client in the program, using the applying the pricing for an account module 306. The framework 300 may use, for example, ASP.NET, DHTMPL (Dynamic HTML), and/or AJAX (asynchronous JavaScript and XML) for the presentation and application layers. The platform data web service 310 at the host 54 (see FIG. 4) aggregates enterprise data from a billing system 312 and the account database 23 using, for example, stored procedure calls.

Figure 7:
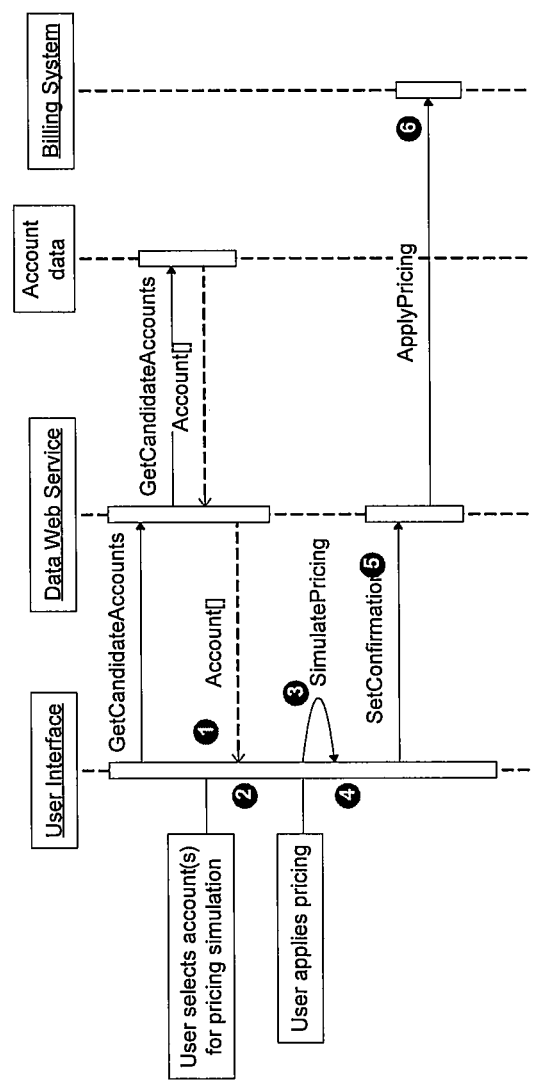
FIG. 7 depicts a sequence of events performed by the application according to various embodiments of the present invention.

FIG. 7 depicts at a high level the sequence of events performed by the application of FIGS. 5 and 6 according to various embodiments. The user, at step 1, may select accounts for the pricing simulation. The accounts may be existing accounts of the brokerage that are eligible for the cumulative PV-based pricing structure. The user interface requests the accounts from the data web service 310, which gets the account data from the account database 314, which is returned to the user interface. At step 2, the user may simulate the pricing for the account(s). At step 3, the user may select to enroll the account(s) in the program based on the simulation results. At step 4, a confirmation of enrollment in the account is sent to the data web service 310, which sends a message to the billing system 312 to apply the cumulative PV-based pricing model.

Figure 8:
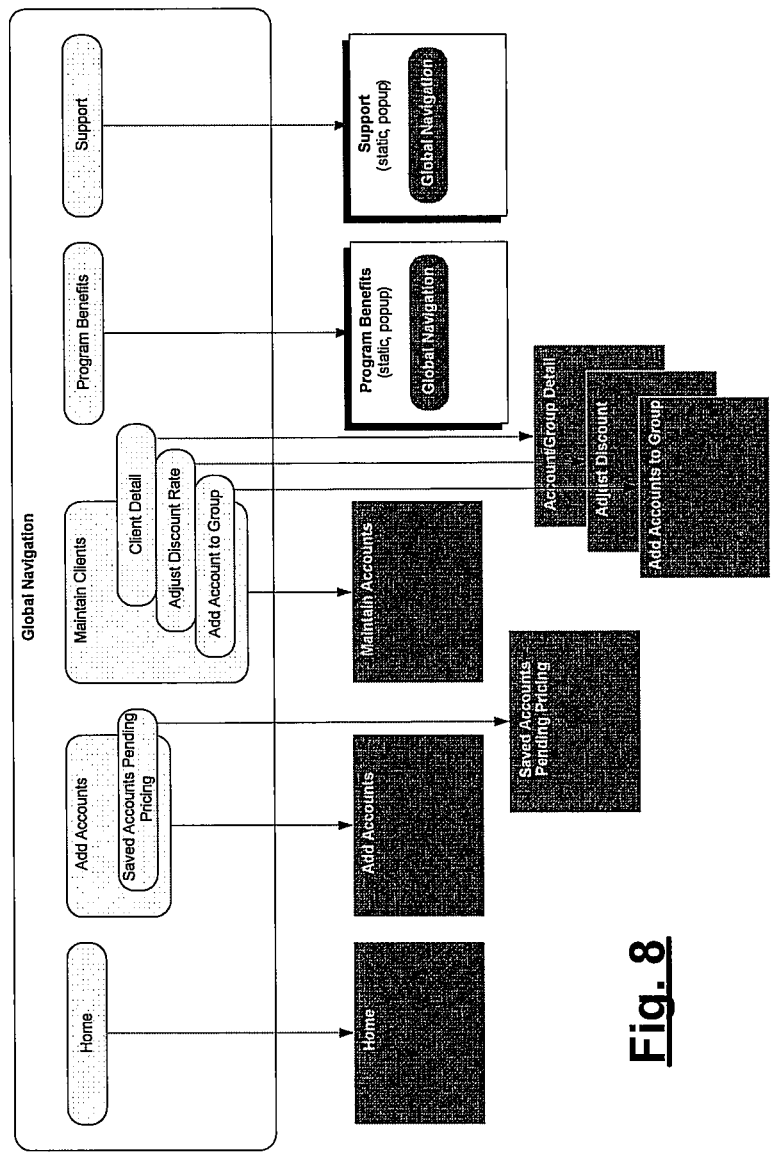
FIG. 8 depicts the navigation of the application according to various embodiments of the present invention.
Figure 10:
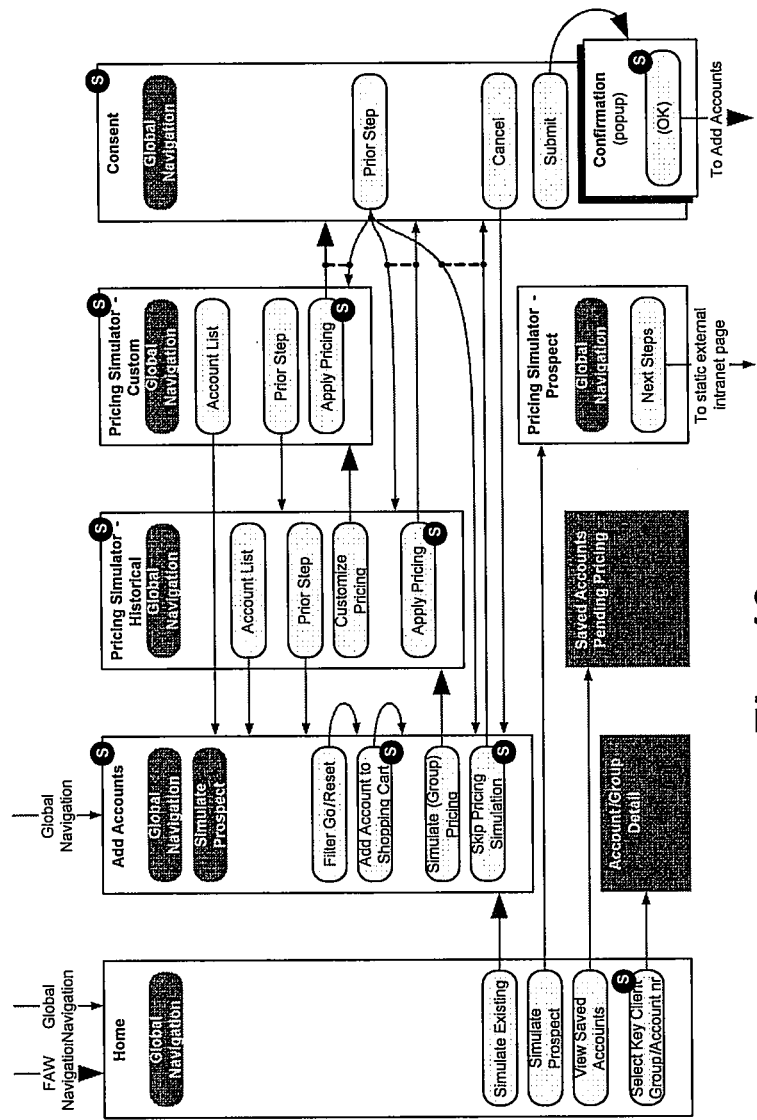
FIGS. 10, 11 and 12 depict additional navigational flows of the application according to various embodiments of the present invention.

FIG. 8 depicts a high-level navigational flow of the FA application according to various embodiments. As shown in FIG. 8, using the application the FA can add accounts or save accounts pending pricing. In addition, the FA may be able to maintain accounts, including adding an account to a group, adjust discount rates for clients, and view/update account details. FIG. 10 depicts the navigational flow from the home page of the FA application according to various embodiments. As shown in FIG. 10, the FA may be able to simulate pricing for existing clients and prospective clients. For existing clients, the simulator may use historical trade data for the client. For prospective clients, a static external intranet page may be used to collect historical trade information regarding the prospective client. The FA may also be able to apply custom pricing, such as discounts, to simulate the pricing. If the cumulative PV-based pricing program is suitable, the FA may begin the client consent process and, once consent is obtained, apply the pricing program to the client's brokerage account. According to various embodiments, as described further below, client consent can be provided verbally for most account types.

Figure 11:
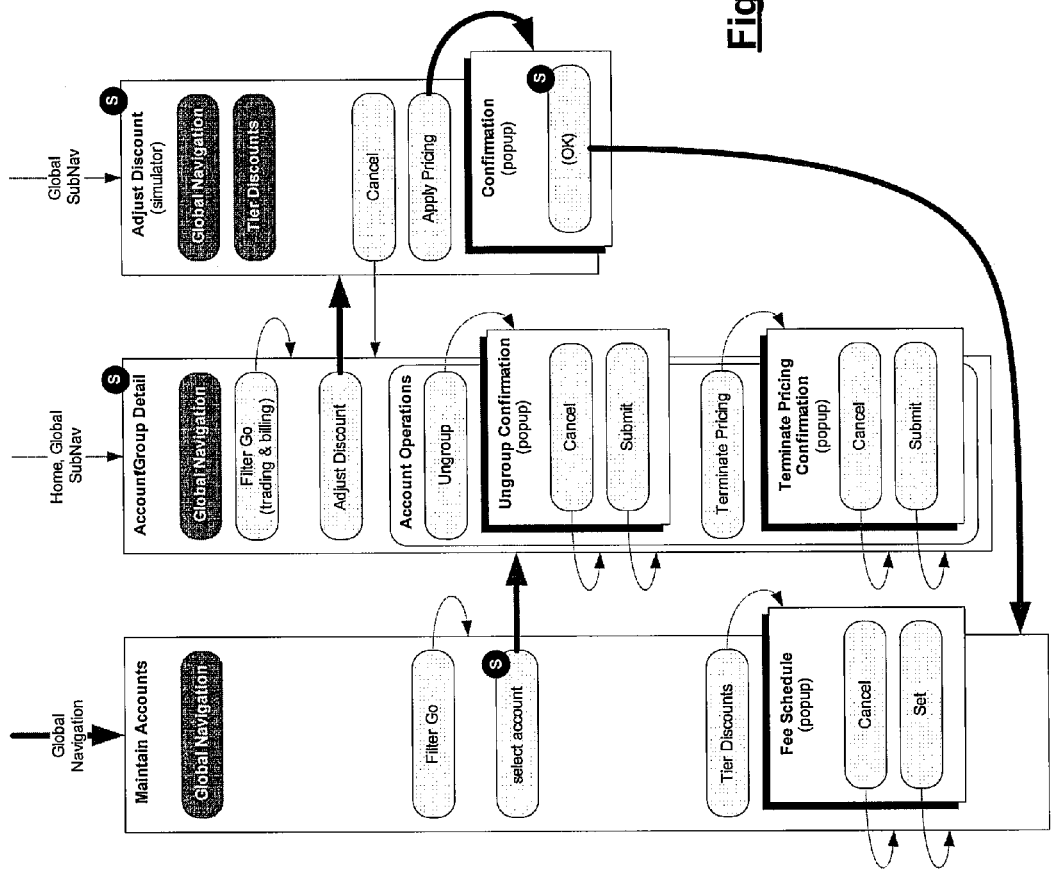
Figure 12:
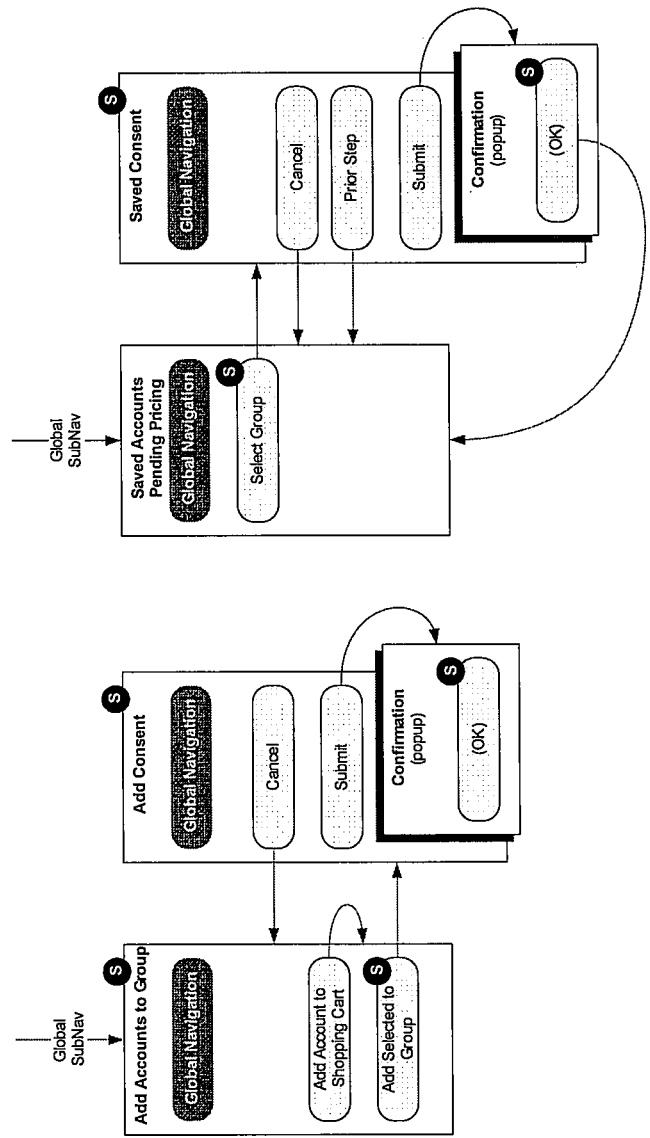

FIG. 11 depicts the navigational flow of the application for maintaining accounts and groups. From this page, the FA may be able to adjust discounts, ungroup accounts, terminate the pricing program for accounts, and apply the pricing, according to various embodiments. FIG. 12 depicts the navigational flow for addition of an account to an existing group according to various embodiments. As shown in FIG. 12, the FA may be required to obtain verbal consent from the client to add an account to a group. The FA may also be able to save accounts pending finalization of the pricing.

Figure 13:
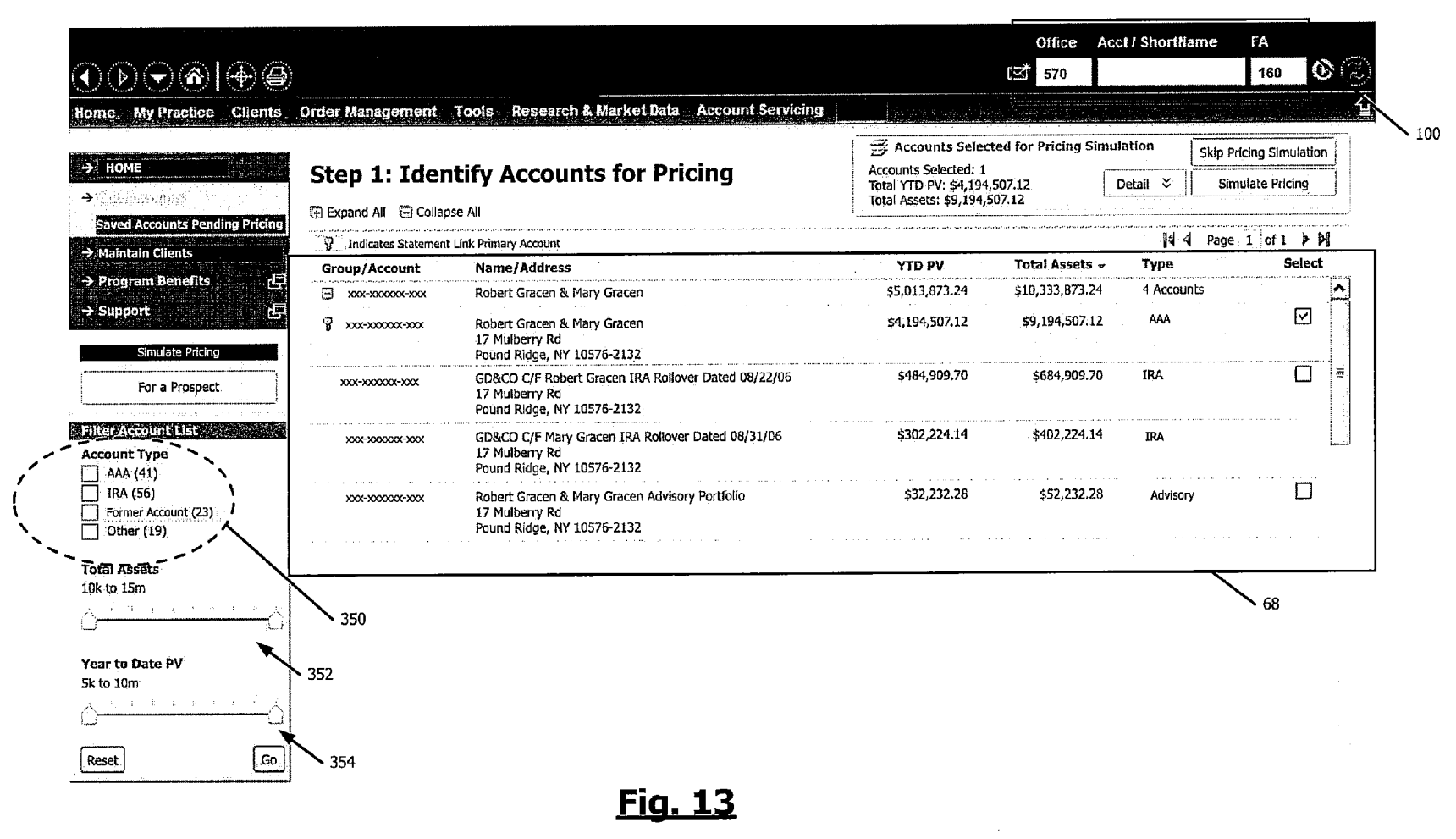

FIGS. 13-18 show example screen shots that may be displayed to the end user of the application according to various embodiments of the present invention. In FIG. 13, the user could search for particular accounts using the search fields 60 in the upper-right portion of the display 100. The user could also filter existing accounts that are not enrolled in the cumulative PV-based commission structure to obtain the account(s) for which the user wants to perform the pricing simulation. The user could filter accounts based on, for example, the account type 350, a total assets filter 352, a year-to-date PV filter 354, or any other suitable consideration. In addition, the user could search for particular accounts using the drop-down window listing accounts (not shown). In other embodiments, the FA may be able to filter accounts based on account type, total assets, inception date, PV, date ranges, etc. In addition, in various embodiments, the user could search for accounts using an account short name lookup field (not shown).

Figure 14:
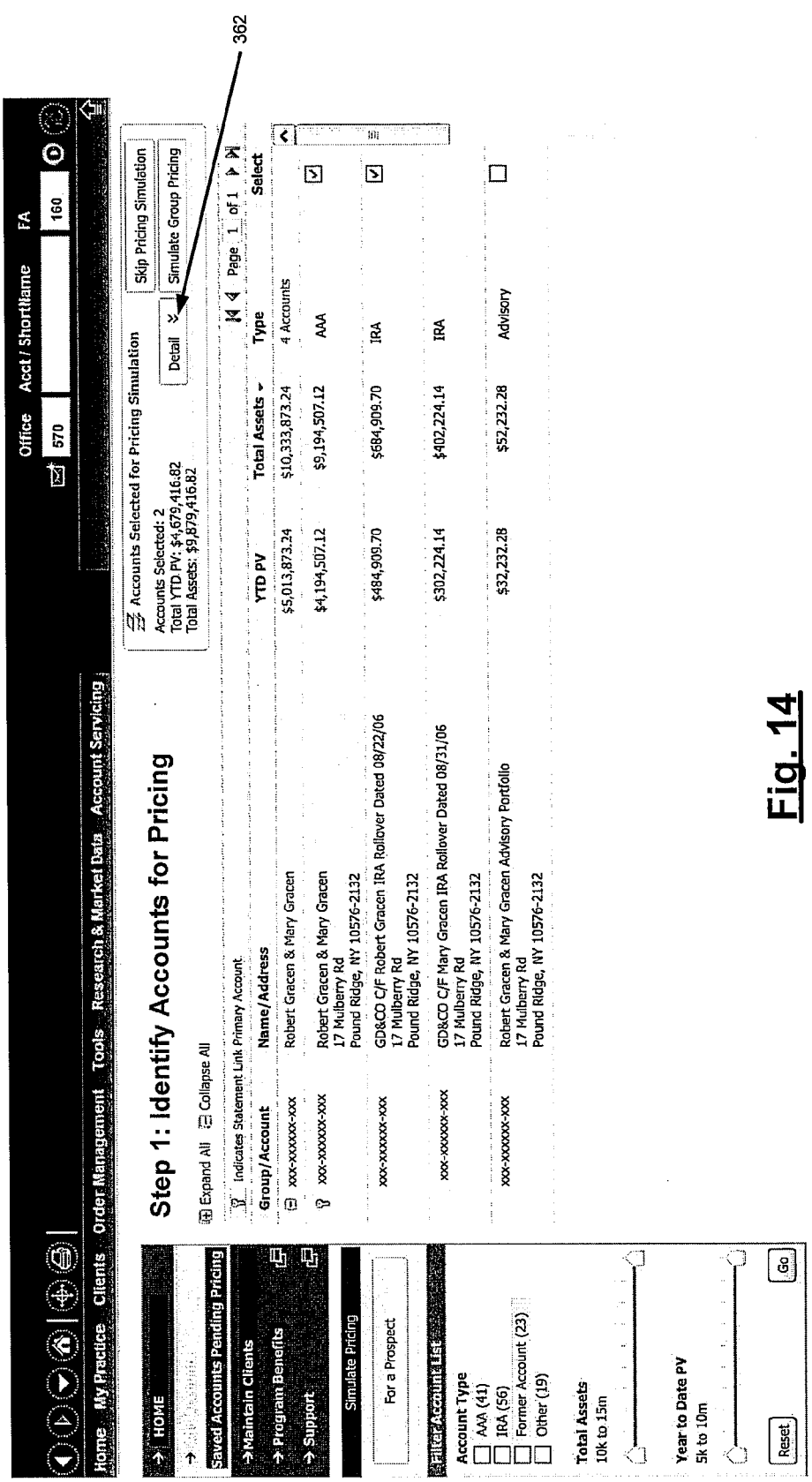

The results from the filtered search may be displayed in field 68. The results may indicate the group/account number, the name and address for the account, the YTD PV, the total assets held by the account, and the type of account. The display may also allow the user to expand groups to see the account information for the accounts comprising a group. The user may then select the accounts for the simulation using the checkboxes 356, for example. The "Accounts Selected for Pricing Simulation" field 360, as shown in FIG. 14, may display the total YTD PV for the selected accounts and the total assets held by the selected accounts. The user could select the "Detail" button 362 to view more detail about the selected accounts, an example of which is shown in FIG. 15. The user may then activate the "Simulate Group Pricing" button 364 to simulate the pricing using the cumulative PV-based commission structure for a group of accounts comprising the two-related accounts shown in the example of FIG. 15.

Figure 16:
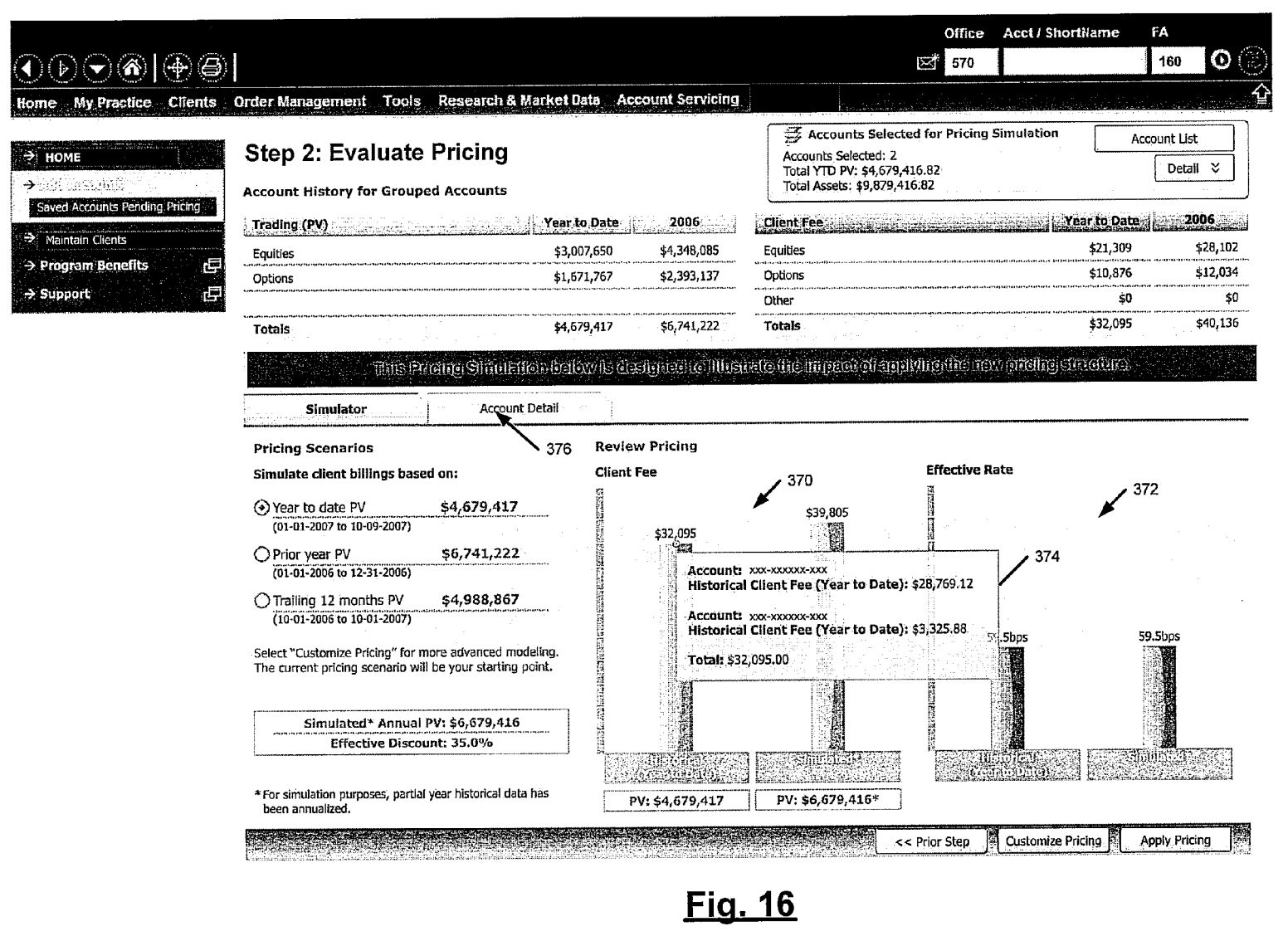

The screen shot of FIG. 16 shows an example of the type of the pricing simulation interface according to various embodiments. The user may use radio buttons 371, for example, to choose to simulate the pricing based on YTD PV, prior year PV, and/or the trailing twelve months PV. Of course, in other embodiments, different time ranges may be used for the simulations. The selected simulation may produce, for example, two charts. The first chart 370 may indicate (1) the commissions and/or fees the group has paid YTD (in this example, since YTD PV was selected) using its existing pricing model and (2) the commissions the group would pay using the cumulative PV-based pricing structure. For the simulation, partial year trade data may be annualized. Commissions using the cumulative PV-based pricing structure may be simulated using the tiered rate schedule described above. The second chart 372 may show the effective commission rate for the group. The charts 370-372 may include mouseovers that provide additional information about the simulations, such as mouseover 374 shown in FIG. 16. In the example of FIG. 16, the mouseover is for the historical client fee bars, so the mouseover shows the account numbers and the historical client fees for the accounts in the group. Moving the cursor can change the information displayed in the mouseover. For example, positioning the cursor over the bars for the simulated client fees would accordingly show the simulated client fees for the accounts in the group in the mouseover 374. Upon activation of the "Account Detail" tab 376, the interface may show additional details regarding the simulation, as shown in FIG. 17. This display shows the simulation results in tabular form.

Figure 18:
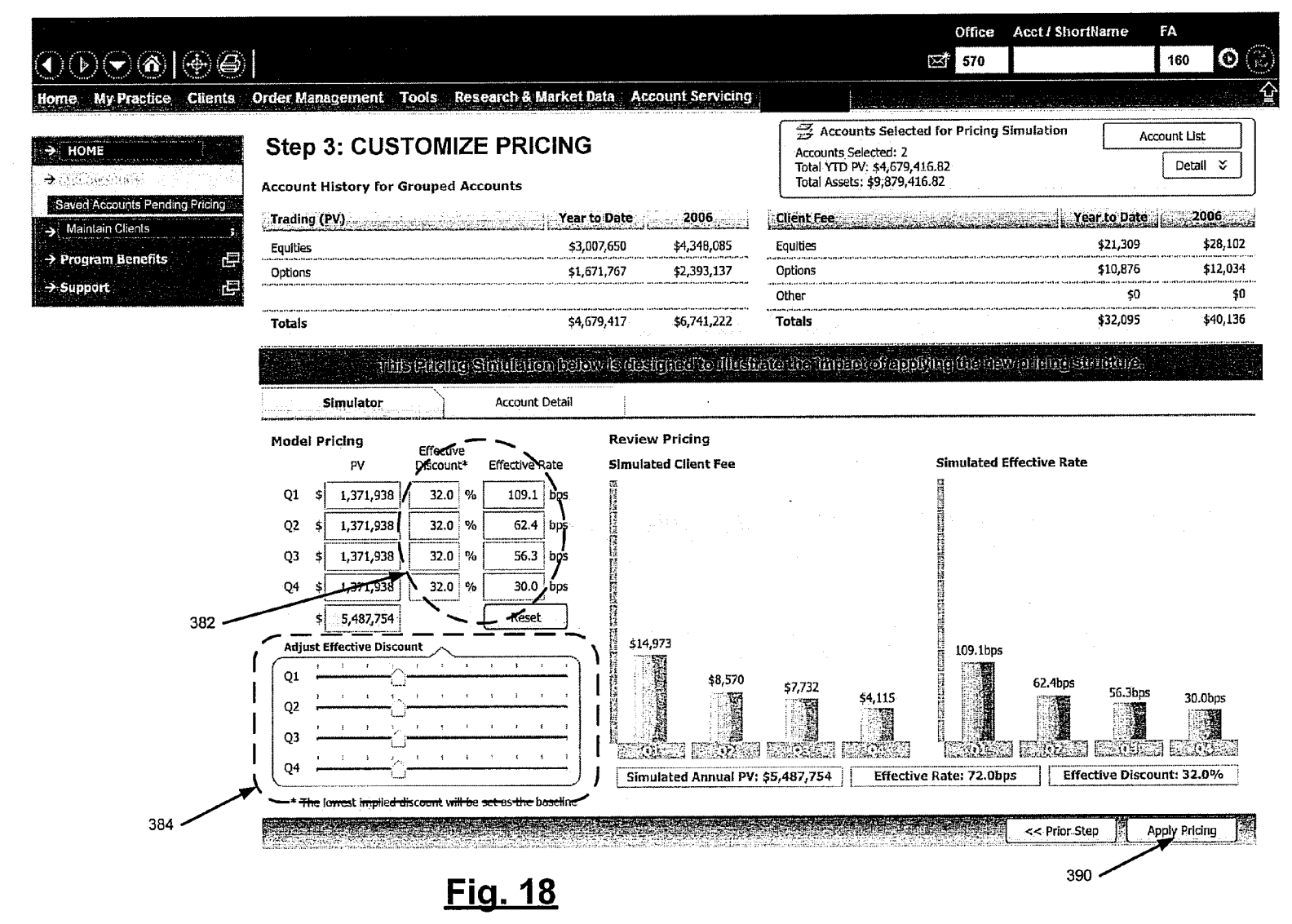

FIG. 18 shows an example screen shot of the interface through which the user can customize pricing for the selected account(s). The interface may be displayed, for example, upon selection of the "Customize Pricing" button 380 (see FIG. 17). In this interface, the user may be able to model the pricing with various discounts applied. The user may input the discounts directly in effective discount input fields 382 or by using the "Adjust Effective Discount" slider inputs 384. As shown in FIG. 18, by selecting the "Detail" button 388 in the "Accounts Selected for Pricing Simulation" field 360, the user may be display information about the accounts used in the information. The user could then select to enroll the accounts, subject to account owner approval, in the cumulative PV-based pricing program by selecting the accounts and activating the "Apply Pricing" button 390.

According to various embodiments, the application may also permit the FA to enroll an existing client in the PV-pricing program with verbal client consent for most account types. In FIG. 18, if the FA activates the "Apply Pricing" button 390, a client consent screen may be displayed for the FA, as shown in FIG. 19. The FA may call or meet with the client to obtain the client's consent, which is documented through the application. The name of the authorized individual providing the consent for the account may be entered in the "Authorized Signatory Name(s)" field 392 and the date that the consent was provided may be specified in field 394. In addition, the FA can specify a flat percentage or "baseline" discount off of the published marginal commission rate schedule for the account, if any, in field 396. The discount may be stored with the client's account data in database 23, for example, and used to calculate the client's commissions once they are enrolled in the program.

In addition, the screen may include checkboxes 397-399 that the FA can check once the FA has discussed the information corresponding to the checkboxes with the client. In example of FIG. 19, for the first checkbox 397, the FA may explain the types of trading activity that are better suited for the PV-pricing program. For the second checkbox 398, the FA may explain generally how the commissions under the cumulative PV-pricing program are calculated. For the third checkbox 399, the FA may explain the discount, if any. Only if all of the checkboxes 397-399 are checked can the user successfully click the Submit button 400. Upon clicking the submit button 400, the system may perform the requisite checks and, if satisfactory, the client will be enrolled in the cumulative PV-pricing program and an electronic confirmation may be displayed for the user, such as shown in FIG. 20. In that way, the FA can obtain the client's verbal consent to enroll in the program. A written confirmation, including letter and pricing agreement, is automatically sent to the client upon enrollment.

The examples presented herein are intended to illustrate potential and specific implementations of the embodiments. The examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details for computer systems are not described herein. Those of ordinary skill in the art will recognize, however, that these and other elements may be desirable in a typical computer system. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware that may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

Also, certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. Such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for determining a brokerage commission owed by a client of a brokerage firm, the system comprising:
   one or more processors; and
   one or more memory units in communication with the one or more processors, wherein the one or more memory unit store instructions that, when executed by the one or more processors, program the one or more processors such that the one or more processors are configured to:
   calculate the cumulative principal volume ("PV") of transactions made by the client through the firm over a first time period, wherein the first time period is multiple days and has a predetermined start date and a predetermined end date, and wherein the PV for an individual transaction made by the client is based on the dollar value for the individual transaction, and the cumulative PV for the first time period is based on a sum of the individual PVs for each transaction made by the client over the first time period;
   calculate the cumulative PV of transactions by the client over a billing time period, where the billing time period is multiple days and has a predetermined start date and a predetermined end date, and wherein the first time period includes the billing time period, and wherein cumulative PV for the billing time period is based on a sum of the individual PVs for each transaction made by the client over the billing time period; and calculate the brokerage commission owed by the client for the billing time period, such that the client is billed in arrears for the transactions made by the client over the billing time period, and wherein the brokerage commission is based on a commission rate schedule and the calculated cumulative PV of the client's transactions over the billing time period, wherein:

the rate schedule comprises two or more tiers that have different, non-overlapping cumulative PV ranges and each tier has an associated commission rate;

the brokerage commission owed by the client for the billing time period is calculated based on a multiplication of (i) the associated commission rate for the tier whose cumulative PV range includes the cumulative PV of the client's transactions over the first time period by (ii) at least a portion of the client's cumulative PV for the billing time period; and the associated commission rates diminish by tier with increasing cumulative PV ranges.

2. The system of claim 1, wherein the PV of a stock transaction is calculated based on the number of stock shares times the share price at the time of the transaction.

3. The system of claim 2, wherein the PV of an options transaction is calculated based on a premium for the options transaction.

4. The system of claim 3, wherein the PV of an options transaction is calculated based on the number of contracts times the number of shares per contract times the premium per share.

5. The system of claim 1, wherein the first time period corresponds to the client's anniversary year-to-date.

6. The system of claim 1, wherein the first time period corresponds the prior twelve months.

7. The system of claim 1, wherein:

the PV of a stock transaction is calculated based on the number of stock shares times the share price at the time of the transaction; and the PV of an options transaction is calculated based on the number of contracts and the number of shares per contract and a premium.

8. The system of claim 1, wherein the transactions comprise transactions made by one brokerage account.

9. The system of claim 1, wherein the transactions comprise transactions made by a group of linked accounts.

10. The system of claim 1, wherein the processors are further programmed to:

calculate a cumulative PV of the client's transactions over a second time period that starts after the end date of the first time period, wherein the second time period is multiple days and has a predetermined start date and a predetermined end date, and wherein the second time period includes a second billing time period that has is multiple days and a predetermined start date and a predetermined end date;

calculate the cumulative PV of the client's transactions over the second billing time period; and calculate the brokerage commission owed by the client for the second billing time period, such that the client is billed in arrears for the transactions made by the client over the second billing time period, and wherein the brokerage commission is based on the commission rate schedule and the cumulative PV of the client's transactions over the second billing time period, wherein calculating the brokerage commission owed by the client for the second billing time period comprises multiplying (i) the associated commission rate for the tier whose cumulative PV range includes the cumulative PV of the client's transactions over the second time period by (ii) at least a portion of the client's cumulative PV for the second billing time period.

11. A system for determining a brokerage commission owed by a client of a brokerage, the system comprising:

a database storing information about transactions made by the client; and one or more processors in communication with the database, wherein the one or more processors are programmed such that the one or more processors are configured to:

calculate the cumulative PV of transactions made by the client through the brokerage firm over a first time period, wherein the first time period is multiple days and has a predetermined start date and a predetermined end date, and wherein the PV for an individual transaction made by the client is based on the dollar value for the individual transaction, and the cumulative PV for the first time period is based on a sum of the individual PVs for each transaction made by the client over the first time period;

calculate the cumulative PV of transactions by the client over a billing time period, where the billing time period is multiple days and has a predetermined start date and a predetermined end date, and wherein the first time period includes the billing time period, and wherein cumulative PV for the billing time period is based on a sum of the individual PVs for each transaction made by the client over the billing time period; and calculate the brokerage commission owed by the client for the billing time period, such that the client is billed in arrears for the transactions made by the client over the billing time period, and wherein the brokerage commission is based on a commission rate schedule and the calculated cumulative PV of the client's transactions over the billing tome period, wherein:

the rate schedule comprises two or more tiers that have different, non-overlapping cumulative PV ranges and each tier has an associated commission rate;

the brokerage commission owed by the client for the billing time period is calculated based on a multiplication of (i) the associated commission rate for the tier whose cumulative PV range includes the cumulative PV of the client's transactions over the first time period by (ii) at least a portion of the client's cumulative PV for the billing time period; and the associated commission rates diminish by tier with increasing cumulative PV ranges.

12. The system of claim 11, wherein:

the PV of a stock transaction is calculated based on the number of stock shares times the share price at the time of the transaction; and the PV of an options transaction is calculated based on the number of contracts and the number of shares per contract and a premium.

13. A computer-implemented method for determining a brokerage commission owed by a client of a brokerage firm, the method comprising:

calculating, by a computer system, a cumulative PV of the client's transactions over a first time period, wherein the first time period is multiple days and has a predetermined start date and a predetermined end date, and wherein the PV for an individual transaction made by the client is based on the dollar value for the individual transaction, and the cumulative PV for the first time period is based on a sum of the individual PVs for each transaction made by the client over the first time period;

calculating, by the computer system, the cumulative PV of the client's transactions over a billing time period, where the billing time period is multiple days and has a predetermined start date and a predetermined end date, and wherein the first time period includes the billing time period, and wherein cumulative PV for the billing time period is based on a sum of the individual PVs for each transaction made by the client over the billing time period; and calculating, by the computer system, the brokerage commission owed by the client for the billing time period, such that the client is billed in arrears for the transactions made by the client over the billing time period, and wherein the brokerage commission is based on a commission rate schedule and the cumulative PV of the client's transactions over the billing time period, wherein:

the rate schedule comprises two or more tiers that have different, non-overlapping cumulative PV ranges and each tier has an associated commission rate;

calculating the brokerage commission owed by the client for the billing time period comprises multiplying (i) the associated commission rate for the tier whose cumulative PV range includes the cumulative PV of the client's transactions over the first time period by (ii) at least a portion of the client's cumulative PV for the billing time period; and the associated commission rates diminish by tier with increasing cumulative PV ranges.

14. The method of claim 13, wherein:

the PV of a stock transaction is calculated based on the number of stock shares times the share price at the time of the transaction; and the PV of an options transaction is calculated based on the number of contracts and the number of shares per contract and a premium.

15. The method of claim 13, wherein calculating the brokerage commission comprises periodically calculating the brokerage commission following successive, period multi-day, periodic billing time periods.

16. The method of claim 13, further comprising:

calculating, by the computer system, a cumulative PV of the client's transactions over a second time period that starts after the end date of the first time period, wherein the second time period is multiple days and has a predetermined start date and a predetermined end date, and wherein the second time period includes a second billing time period is multiple days and that has a predetermined start date and a predetermined end date;

calculating, by the computer system, the cumulative PV of the client's transactions over the second billing time period; and calculating, by computer system, the brokerage commission owed by the client for the second billing time period, such that the client is billed in arrears for the transactions made by the client over the second billing time period, and wherein the brokerage commission is based on the commission rate schedule and the cumulative PV of the client's transactions over the second billing time period, wherein calculating the brokerage commission owed by the client for the second billing time period comprises multiplying (i) the associated commission rate for the tier whose cumulative PV range includes the cumulative PV of the client's transactions over the second time period by (ii) at least a portion of the client's cumulative PV for the second billing time period.

17. A system for forecasting periodic brokerage commissions owed by a party, the system comprising:

a database storing trade data regarding the party; and a computer system in communication with the database, wherein the computer system is programmed such that it is configured to forecast the brokerage commissions of the party based on a cumulative PV of trading activity for the party based on the trade data stored in the database by:

calculating the cumulative PV of transactions made by the party over a first time period, wherein the first time period is multiple days and has a predetermined start date and a predetermined end date, and wherein the PV for an individual transaction made by the client is based on the dollar value for the individual transaction, and the cumulative PV for the first time period is based on a sum of the individual PVs for each transaction made by the client over the first time period;

calculating the cumulative PV of transactions by the party over a billing time period, where the billing time period is multiple days and has a predetermined start date and a predetermined end date, and wherein the first time period includes the billing time period, and wherein cumulative PV for the billing time period is based on a sum of the individual PVs for each transaction made by the client over the billing time period; and calculating the forecast of the brokerage commission owed by the party in arrears for the billing time period based on a commission rate schedule and the calculated cumulative PV of the party's transactions over the billing tome period, wherein:

the rate schedule comprises two or more tiers that have different, non-overlapping cumulative PV ranges and each tier has an associated commission rate;

the forecast of the brokerage commission owed by the party for the billing time period is calculated based on a multiplication of (i) the associated commission rate for the tier whose cumulative PV range includes the cumulative PV of the party's transactions over the first time period by (ii) at least a portion of the party's cumulative PV for the billing time period; and the associated commission rates diminish by tier with increasing cumulative PV ranges.

18. The system of claim 17, wherein the party is an existing client of a brokerage, and the database stores historical trade data for the party.

19. The system of claim 17, wherein the party is a prospective client of a brokerage.

\* \* \* \* \*

UNITED STATES PATENT AND TRADEMARK OFFICE
CERTIFICATE OF CORRECTION

| | | |
|---|---|---|
| PATENT NO. | : 8,498,921 B2 | Page 1 of 1 |
| APPLICATION NO. | : 12/165451 | |
| DATED | : July 30, 2013 | |
| INVENTOR(S) | : Nordstrom et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this
Twenty-third Day of December, 2014

Michelle K. Lee
*Deputy Director of the United States Patent and Trademark Office*